United States Patent Office 3,228,971
Patented Jan. 11, 1966

3,228,971
PREPARATION OF ACETIC ACID ESTERS
Alexander F. MacLean, Corpus Christi, Tex., assignor to Celanese Corporation of America, New York, N.Y., a corporation of Delaware
No Drawing. Filed May 23, 1960, Ser. No. 30,764
1 Claim. (Cl. 260—465.4)

This invention relates to the production of esters of organic acids.

It is an object of this invention to provide a new process for the production of esters directly from hydrocarbons.

It is another object of this invention to provide a new process for the production of alcohols from hydrocarbons.

Other objects of this invention will be apparent from the following detailed description and claims. In this description and claims, all proportions are by weight unless otherwise specified.

In accordance with one aspect of this invention, an organic peracid such as peracetic acid is reacted with a hydrocarbon or a substituted hydrocarbon having at least one saturated carbon atom of which at least one of the bonds is united to a hydrogen atom and of which the remaining bonds of which are united to carbon atoms. By a saturated carbon atom, is meant one having only single bond linkages as distinguished from linkages such as olefinic linkages. The saturated carbon atom may be shown structurally as follows:

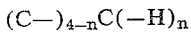

$$(C-)_{4-n}C(-H)_n$$

where $n$ is a number between 1 and 4. The reaction product is an ester wherein at least one of the H atoms has been replaced by an acetoxy group.

Where the hydrocarbon has more than one of the described saturated carbon atoms, the hydrogen having the lowest C—H bond energy will be primarily replaced. However, hydrogen atoms attached to the other saturated carbons may also be replaced to a minor extent. Thus, where p-xylene is reacted with peracetic acid, a minor amount of p-xylylene diacetate forms in addition to the primary product, xylyl acetate.

The hydrocarbons which may be employed include alkanes such as n-octane, alkenes such as octene-1 and cyclohexene, cycloalkanes such as cyclohexane and bicyclohexyl and aromatic hydrocarbons such as xylene, toluene and cumene, as well as substituted hydrocarbons including nitriles such as propionitrile, carbonyl containing hydrocarbons such as methyl ethyl ketone. The substituted hydrocarbons used are advantageously free of groups which would interfere with the reaction.

The reaction is preferably carried out in the presence of a catalyst. Varivalent metals, i.e., metals having a plurality of different valences, such as cobalt or manganese provide such oxidation catalysts. A particularly suitable catalyst is one containing both cobalt and copper. While desirable yields are obtained by using cobalt alone as catalyst, it has been found that the addition of copper to the catalyst promotes the formation of ester, thereby increasing yields thereof. It is most convenient to use these catalysts in the form of their salts, capable of dissolving at least slightly in the reaction mixture. Thus, the metals may be in the form of their carboxylic acid salts (e.g., as the acetate, propionates, butyrates or valerates). The relative proportions of copper and cobalt may be suitably in the range of about 1/1 to 100/1 atoms of copper per atom of cobalt. The proportion of catalyst in the reaction mixture may be quite small. For example, the concentration of cobalt may be in the range of about 0.05 to 1%.

It is preferable to have the catalysts used in solution. Where the catalysts in the proportions used are not soluble in the reactants. It has been found advantageous to conduct the reaction in a polar solvent medium, preferably in a carboxylic acid medium such as acetic acid. The proportion of the carboxylic acid in the reaction mixture may be suitably in the range of about 35% to 90%, there being 0.5 to 10 moles of the carboxylic acid present per mole of hydrocarbon initially present in the reaction mixture. Other solvents which may be advantageously used are acetonitrile and solvent consisting of minor proportions of water and acetonitrile or acetic acid. It should be noted that the solvent selected should not have hydrogen atoms connected by bonds of lower energy than those of the hydrocarbon being oxidized.

The peracetic acid is preferably supplied as a solution; for example, a solution of about 10 to 40% concentration in a solvent such as acetic acid, propionic acid and butyric acid. The use of a solvent which is the same as the acid medium simplifies the recovery of the products, but other solvents such as methylal, methyl acetate and acetone may be used.

It is desirable to add the peracetic acid slowly to the other components of the reaction mixture under continuous agitation. In this manner, the peracetic acid reacts almost immediately upon addition and is not permitted to accumulate and consequently to undergo undesirable decomposition. For best results about 0.25 mole of peracetic acid is added for each mole of hydrocarbon initially present in the reaction mixture.

The reaction is preferably conducted at elevated temperatures. Suitably the temperature may be within the range of about 70 to 140° C.

For best results, the reaction mixture should be substantially anhydrous and water of reaction should be removed quickly, e.g., by azeotropic distillation, to reduce hydrolysis of the ester formed.

The following examples are given to illustrate this invention further:

Example I

To a mixture of 1.0 mole of acetic acid, 1.0 mole of p-xylene, 0.02 mole of cobaltic acetate and 0.01 mole of cupric acetate in a vessel fitted with a reflux condenser heated to and maintained at reflux temperature, 0.25 mole of peracetic acid dissolved in 0.9 mole of acetic acid are added dropwise over a period of 150 minutes while the mixture is continuously stirred. The temperature of the mixture is allowed to fall to room temperature. Acetic acid is extracted from the reaction product with water. P-xylene is then removed by distillation. The residue is filtered and xylyl acetate is then recovered from the filtrate by conventional distillation procedures. The yield is 36% of theoretical.

Example II

To a mixture of 1.0 mole of acetic acid, 1.0 mole of p-xylene, and .01 mole of cobaltic acetate, in a vessel fitted with a reflux condenser heated to and maintained at reflux temperature, 0.25 mole of peracetic acid dissolved in 0.9 mole of acetic acid are added dropwise over a period of 95 minutes while the mixture is continually stirred. The temperature of the mixture is allowed to fall to room temperature. The reaction product is extracted with water. P-xylene is removed from the extracted phase by distillation. The residue is filtered and xylyl acetate is then recovered from the filtrate by conventional distillation procedures. The yield is 49% of theoretical.

Example III

To a mixture of 1.0 mole of cyclohexane, 1.0 mole of cyclohexane, 1.0 mole of acetic acid, 0.01 mole of cupric acetate and 0.01 mole of cobaltic acetate in a vessel fitted with a reflux condenser heated to and maintained at reflux temperature, 0.25 mole of peracetic acid dissolved in 0.9 mole of acetic acid is added dropwise over a period of 135 minutes while the mixture is continually stirred. Temperature of the mixture is allowed to fall to room temperature. The product is extracted with water. The water phase is separated and extracted with cyclohexane. The organic phases of the extractions which contain the acetoxycyclohexane product are then combined.

*Example IV*

Example III is repeated using the same ingredients and proportions except that n-octane is substituted for cyclohexane. The esters produced are a mixture of 2-acetoxyoctane, 3-acetoxyoctane, 4-acetoxyoctane and 5-acetoxyoctane.

*Example V*

Example III is repeated using the same ingredients and proportions except that octene-1 is substituted for cyclohexane. The principal ester produced is 3-acetoxy-1-octene.

Example III is repeated using the same ingredients and proportions except that bicyclohexyl is substituted for cyclohexane. The principal ester produced is 1-cyclohexyl-cyclohexyl acetate.

*Example VII*

Example III is repeated using the same ingredients and proportions except that the cumene is substituted for cyclohexane. The principal ester produced is 2-phenyl-2-acetoxypropane.

*Example VIII*

Example III is repeated using the same ingredients and proportions except that toluene is substituted for cyclohexane. The principal ester produced is benzyl acetate.

*Example IX*

To a mixture of 1.0 mole of methyl ethyl ketone, 1.0 mole of acetic acid, 0.01 mole of cupric acetate and 0.01 mole of cobaltous acetate heated to and maintained at reflux temperature in a vessel fitted with a reflux condenser, 0.25 mole of peracetic acid are added dropwise over a period of 135 minutes while the mixture is continually stirred. Stirring is continued while the temperature of the mixture is allowed to fall to room temperature. The product is then extracted with a mixture of 300 ml. of water and 50 ml. of benzene. The phases are separated and the benzene phase extracted with 100 ml. of water. The water layers are then combined and extracted with 50 ml. of benzene. The benzene layers are then combined. They contain 3-acetoxybutanone-2, the principal ester produced.

*Example X*

Example IX is repeated using the same ingredients and proportions except that propionitrile is substituted for methyl ethyl ketone. The products are 1-acetoxy-1-cyanoethane and 2-acetoxy-1-cyanoethane.

While there has been described what are at present considered to be the preferred embodiments of this invention, it will be obvious to those skilled in the art that various changes and modifications may be made therein without departing from the invention and it is therefore, aimed to cover all such changes and modifications as fall within the true spirit and scope of the invention.

Having described my invention, what I desire to secure by Letters Patent is:

The process which comprises reacting a compound selected from the group consisting of xylene, cyclohexene, octane, octene, cyclohexane, bi-cyclohexyl, toluene, cumene, propionitrile and methyl ethyl ketone with peracetic acid under reflux at a temperature of about 70 to 140° C. in an acetic acid solvent in the presence of a cobalt and a copper catalyst, said cobalt catalyst being present in proportions of about 0.05 to 1% and said copper catalyst being present in a ratio of about 1 to 1 to 100 to 1 atoms of copper to atoms of cobalt, said peracetic acid being added in proportion of about 0.25 mole per mole of said compound initially present in the reaction mixture, the product of said process being an acetate ester of said compound.

References Cited by the Examiner

UNITED STATES PATENTS

| 2,073,011 | 3/1937 | Hubbuch | 260—405 |
| 2,265,948 | 12/1941 | Loder | 260—533 |
| 2,470,808 | 5/1949 | De Groote et al. | 260—406 |

OTHER REFERENCES

Becco, Bulletin No. 4, "Peracetic Acid 40%" (Becco Chemical Division-Food Machinery & Chemical Corp.), 1956, pages 5–7.

Groggins, "Unit Processes in Organic Synthesis," 3rd ed. (1947), pages 478 and 479.

LORRAINE A. WEINBERGER, *Primary Examiner.*

CHARLES B. PARKER, ABRAHAM H. WINKELSTEIN, TOBIAS E. LEVOW, LEON ZITVER, *Examiners.*